No. 787,541. PATENTED APR. 18, 1905.
A. S. RAMAGE.
PROCESS OF CONVERTING LEAD SULFATE INTO LEAD HYDROXID.
APPLICATION FILED DEC. 16, 1904.

I. $3030 Pb SO_4 + 880 NaHO = 2169 Pb H_2 O_2 + 321 Na_2 Pb O_2 + 1420 Na_2 SO_4$

II. $321 Na_2 Pb O_2 + 909 Pb SO_4 = 241 Pb H_2 O_2 + 847 Pb H_2 O_2 \cdot 2 Pb SO_4 + 142 Na_2 SO_4$ III. $847 Pb H_2 O_2 \cdot 2 Pb SO_4 + 176 NaHO = 674.8 Pb H_2 O_2 + 64.2 Na_2 Pb O_2 + 284 Na_2 SO_4$ Witnesses
R A Balderson
J. B. Hill Inventor:
Alexander S. Ramage,
by Byrnes & Townsend,
Att'ys.

No. 787,541.                                              Patented April 18, 1905.

UNITED STATES PATENT OFFICE.

ALEXANDER S. RAMAGE, OF DETROIT, MICHIGAN.

PROCESS OF CONVERTING LEAD SULFATE INTO LEAD HYDROXID.

SPECIFICATION forming part of Letters Patent No. 787,541, dated April 18, 1905.

Application filed December 16, 1904. Serial No. 237,165.

*To all whom it may concern:*

Be it known that I, ALEXANDER S. RAMAGE, a citizen of the United States, residing at Detroit, in the county of Wayne and State of Michigan, have invented certain new and useful Improvements in Processes of Converting Lead Sulfate into Lead Hydroxid, of which the following is a specification.

When lead sulfate is treated with an equimolecular quantity of sodium hydroxid in aqueous solution, about ninety per cent. of the lead is converted into hydroxid. A portion of the lead dissolves in the sodium-hydroxid solution with the production of sodium plumbite, and about ten per cent. of the lead sulfate remains unchanged.

According to the present process lead sulfate—for example, the waste from sulfuric-acid chambers—is treated with a sufficient excess of sodium hydroxid to entirely decompose the sulfate, the preferred excess being from ten to fifteen per cent. About ten per cent. of the lead goes into solution as sodium plumbite. The solution containing sodium plumbite and sodium sulfate is then separated from the lead hydroxid and treated with lead sulfate in amount sufficient to decompose the plumbite and convert all of the sodium therein into sulfate, the reacting proportions being one molecule of plumbite to three molecules of lead sulfate. One atom of lead appears as lead hydroxid and three atoms of lead as basic lead sulfate. The sodium sulfate is recovered from the solution as Glauber's salts, and the basic lead sulfate is treated with an excess of sodium hydroxid, whereby the major portion of the lead is converted into hydroxid. A part of the lead goes into solution as plumbite and is recovered as before.

Figure 1:
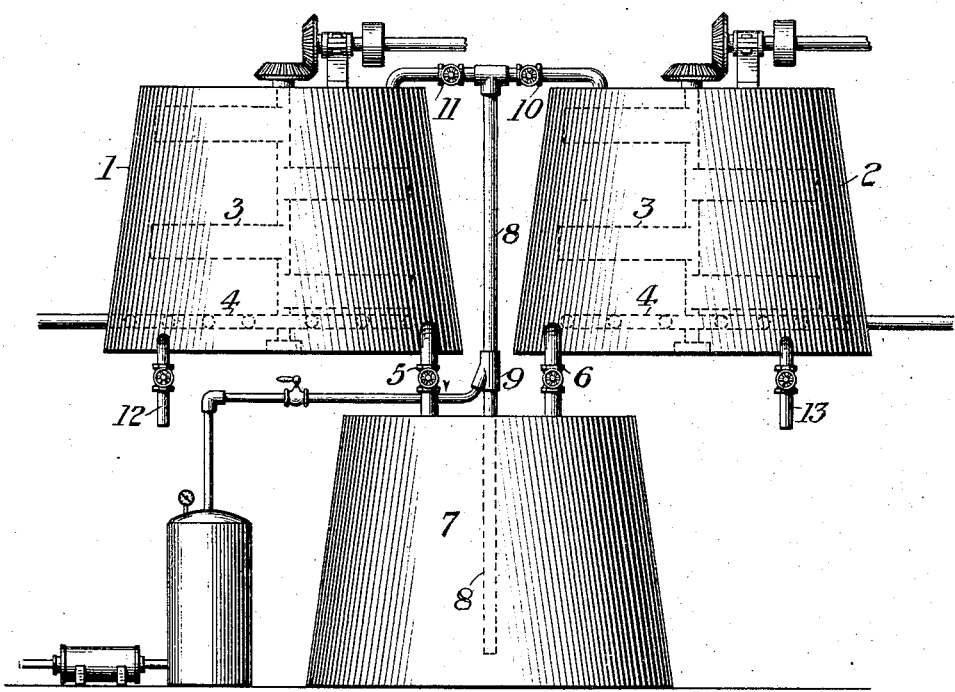
Figure 2:
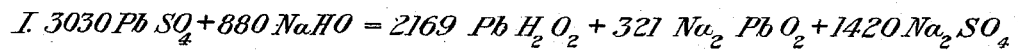
Figure 2:
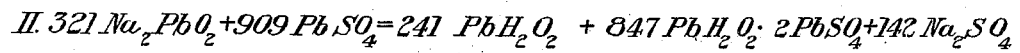
Figure 2:

Referring to the accompanying drawings, Figure 1 is a side elevation of apparatus which may be employed to carry out the process, and Fig. 2 shows three equations which represent the principal reactions occurring in the process.

The apparatus illustrated in Fig. 1 comprises tanks 1 2, in which the reactions are effected. Each of these tanks contains a rotary agitator 3 and a heating-coil 4. Valved pipes 5 6 are arranged to deliver the solutions from the tank 1 or 2 into a lower tank 7, from which they are again lifted through a pipe 8 by means of an ejector 9 and delivered through valved branch pipe 10 or 11 into the tank 2 or 1. Discharge-pipes 12 13 lead from the bottom of the tanks 1 2. In employing this apparatus to carry out the process each of the tanks 1 2 is charged with three thousand and thirty pounds of lead sulfate. An aqueous solution of sodium hydroxid having a density of about ten per cent. Baumé is then run into the tank 1. The solution preferably contains nine hundred pounds of sodium hydroxid; but for the purpose of illustration it will be assumed that eight hundred and eighty pounds are employed. The solution is then heated for one hour by means of the coil 4, and the insoluble residue is allowed to settle. The reaction thus effected is represented by the formula:

I. $3030PbSO_4 + 880NaHO =$
    $2169PbH_2O_2 + 321Na_2PbO_2 + 1420Na_2SO_4.$

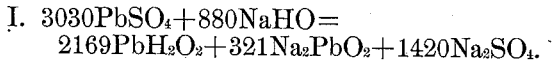

The clear solution containing sodium plumbite and sodium sulfate is then run from tank 1, through pipe 6, into tank 7 and thence delivered by pipe 8, ejector 9, and pipe 10 into the second treating-tank 2. The lead hydroxid which has settled to the bottom of tank 1 is washed with water, and the washings are also introduced into the tank 2. The sodium plumbite thus introduced into the tank 2 reacts with a portion of the lead sulfate therein, with the production of lead hydroxid, basic lead sulfate and sodium sulfate. This reaction may be represented by the following formula:

II. $321Na_2PbO_2 + 909PbSO_4 = 241PbH_2O_2 +$
    $847PbH_2O_2.2PbSO_4 + 142Na_2SO_4.$

When the contents of the tank 2 show no reaction with red litmus, the solution is drawn off and the sodium sulfate therein derived both from the sodium hydroxid employed in tank 1 and from the sodium plumbite decomposed in tank 2 is drawn off and recovered as Glauber's salt. The insoluble residue in tank 2, containing lead hydroxid, basic lead sulfate, and unconverted lead sulfate, is then analyzed, and an aqueous solution of sodium hydroxid, containing a proportionate excess of sodium hydroxid to entirely decompose the basic lead sulfate and unchanged lead sulfate, is added. The contents of the tank is then heated for one hour, the reaction between the basic sulfate and alkali hydroxid being represented by the following formula:

III. 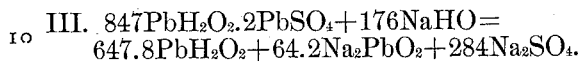

The insoluble material is allowed to settle, and the clear solution is run into tank 7. The residue is washed with water and the washings are also run into tank 7. The lead hydroxid may be withdrawn from tanks 1 2, but is preferably dissolved in sufficient acetic acid to form a basic solution and heated. Any iron and coloring-matters therein are thus precipitated, and the acetate can be directly employed for the manufacture of chrome-yellow. After the tanks 1 2 have been emptied of their contents they are recharged with lead sulfate. The solution of sodium plumbite and sodium sulfate drawn from the tank 2 into the tank 7 is thence delivered through the pipes 8 11 into the tank 1, an excess of sodium hydroxid is added, and the original cycle of operations is repeated.

I claim—

1. The process of converting lead sulfate into lead hydroxid, which consists in treating lead sulfate with an excess of an alkali hydroxid and directly producing lead hydroxid and a solution containing lead, separating said lead hydroxid and solution, and treating said solution with another portion of lead sulfate, as set forth.

2. The process of converting lead sulfate into lead hydroxid, which consists in treating lead sulfate with an excess of an alkali hydroxid and directly producing lead hydroxid and a solution containing lead, separating said lead hydroxid and solution, treating said solution with another portion of lead sulfate, thereby producing a basic lead sulfate, and decomposing said basic lead sulfate with an alkali hydroxid, as set forth.

3. The process of converting lead sulfate into lead hydroxid, which consists in treating lead sulfate with an excess of an alkali hydroxid and directly producing lead hydroxid and a solution containing lead, separating said lead hydroxid and solution, causing said solution to react on another portion of lead sulfate, thereby precipitating the lead in solution as basic lead sulfate, and treating the resulting mixture of lead sulfate and basic lead sulfate with a solution containing an excess of an alkali hydroxid, as set forth.

4. The process of converting lead sulfate into lead hydroxid, which consists in treating lead sulfate with an excess of an alkali hydroxid and directly producing lead hydroxid and a solution containing lead, separating said lead hydroxid and solution, causing said solution to react on another portion of lead sulfate, thereby precipitating the lead in solution as basic lead sulfate, treating the resulting mixture of lead sulfate and basic lead sulfate with a solution containing an excess of an alkali hydroxid, separating the resulting solution, and repeating the same cycle of operations on successive portions of lead sulfate, as set forth.

In testimony whereof I affix my signature in presence of two witnesses.

ALEXANDER S. RAMAGE.

Witnesses:
EUGENE A. BYRNES,
CLINTON P. TOWNSEND.